US008737022B2

(12) United States Patent
Kato et al.

(10) Patent No.: US 8,737,022 B2
(45) Date of Patent: May 27, 2014

(54) MULTILAYER FILM, MAGNETIC HEAD, MAGNETIC HEAD DEVICE, MAGNETIC RECORDING/REPRODUCING APPARATUS AND METHOD FOR MANUFACTURING MULTILAYER FILM

(75) Inventors: Masaya Kato, Tokyo (JP); Atsushi Yamaguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/548,715

(22) Filed: Jul. 13, 2012

(65) Prior Publication Data

US 2014/0016233 A1    Jan. 16, 2014

(51) Int. Cl.
*G11B 5/127*     (2006.01)
(52) U.S. Cl.
USPC .................................. 360/319; 360/125.01

(58) Field of Classification Search
USPC ............................................ 360/319, 125.01
See application file for complete search history.

(56) References Cited

FOREIGN PATENT DOCUMENTS

| JP | 5-182145 | 7/1993 |
|----|----------|--------|
| JP | H06-005423 A | 1/1994 |
| JP | 07029734 A * | 1/1995 |
| JP | 07066034 A * | 3/1995 |
| JP | 08124121 A * | 5/1996 |
| JP | 11-25420 | 1/1999 |
| JP | 2000-48327 | 2/2000 |
| JP | 2003-45719 | 2/2003 |

* cited by examiner

*Primary Examiner* — Will J Klimowicz
(74) *Attorney, Agent, or Firm* — Oblon, Spivak, McClelland, Maier & Neustadt, L.L.P.

(57) ABSTRACT

A multilayer film includes a magnetic film and a non-magnetic film. The magnetic film and the non-magnetic film are alternately stacked. The magnetic film contains Fe, Ni and P but has Fe or Ni as a main component. The non-magnetic film contains Fe, Ni and P but has Ni as a main component.

15 Claims, 12 Drawing Sheets

(A)

(B)

MULTILAYER FILM, MAGNETIC HEAD, MAGNETIC HEAD DEVICE, MAGNETIC RECORDING/REPRODUCING APPARATUS AND METHOD FOR MANUFACTURING MULTILAYER FILM

TECHNICAL FIELD

The present invention relates to a multilayer film, a magnetic head, a magnetic head device, a magnetic recording/reproducing apparatus and a method for manufacturing the multilayer film.

BACKGROUND OF THE INVENTION

In connection with an increase in recording density of magnetic recording heads, there is a great need for improvement in high-frequency characteristics and improvement in erase by a recording head or a shield. To this end, attempts to use a multilayer film in which magnetic and non-magnetic films are alternately stacked as a shield have been made as disclosed in Japanese Unexamined Patent Application Publication Nos. 5-182145 and 2000-48327.

On the other hand, it is a common practice that the magnetic film is formed from a magnetic material, while the non-magnetic film is formed from a non-magnetic material. Accordingly, there is a restriction that both the magnetic material and the non-magnetic material have to be prepared for formation of both the magnetic film and the non-magnetic film.

Moreover, although the multilayer film including magnetic and non-magnetic films can be obtained by a plating process as disclosed in Japanese Unexamined Patent Application Publication No. 11-25420, the plating bath has to be changed for each deposition of the magnetic film and the non-magnetic film, causing a problem of complicating the production process and increasing the production cost.

SUMMARY OF THE INVENTION

It is an object of the present invention to form magnetic and non-magnetic films as a compound of magnetic materials, Fe, Ni and P and provide a multilayer film in which such magnetic and non-magnetic films are alternately stacked and also provide a magnetic head, a magnetic head device and a magnetic recording/reproducing apparatus in which such a multilayer film is employed as a magnetic shield.

It is another object of the present invention to provide a method for manufacturing the foregoing multilayer film.

In order to attain the above object, a multilayer film according to the present invention comprises a magnetic film and a non-magnetic film. The magnetic film and the non-magnetic film are alternately stacked, wherein the magnetic film contains Fe, Ni and P but has Fe or Ni as a main component, while the non-magnetic film contains Fe, Ni and P but has Ni as a main component. The alternate stacking of the magnetic and non-magnetic films stabilizes the magnetic domain structure of the multilayer film, improving the magnetic shielding effect. Moreover, both a magnetic film having a high magnetic flux density and a non-magnetic film having a low magnetic flux density can be obtained by containing Fe or Ni as a main component in a compound of Fe, Ni and P. When the multilayer film has such a structure, furthermore, it becomes unnecessary to use different materials for deposition of the magnetic and non-magnetic films, so that the production process can be simplified.

When containing from 60 to 90 at. % Fe, from 5 to 30 at. % Ni and from 5 to 20 at. % P, the magnetic film has excellent properties as a magnetic film because of its high magnetic flux density. When containing from 5 to 20 at. % Fe, from 65 to 85 at. % Ni and from 10 to 30 at. % P, the non-magnetic film has excellent properties as a non-magnetic film because of its low magnetic flux density.

A magnetic head according to the present invention includes a magnetic shield. The magnetic shield is a multilayer film in which a magnetic film and a non-magnetic film are alternately stacked. The magnetic film contains Fe, Ni and P but has Fe or Ni as a main component, while the non-magnetic film contains Fe, Ni and P but has Ni as a main component. In addition, the head according to the present invention may be combined with a head support device to provide a magnetic head device, and the magnetic head device may be combined with a magnetic recording medium to provide a magnetic recording/reproducing apparatus (HDD). In this magnetic head, since the multilayer film in which magnetic and non-magnetic films are alternately stacked is employed as a magnetic shield, it has a high magnetic shielding effect and is therefore improved in high-frequency characteristics and erase.

Methods for manufacturing a multilayer film and a magnetic head according to the present invention comprise a process of depositing the magnetic film and the non-magnetic film by changing a composition ratio of Fe, Ni and P. Since both the magnetic film and the non-magnetic film can be formed from magnetic materials, the production process can be simplified for formation of the multilayer film including the magnetic film and the non-magnetic film.

As a preferred embodiment, the methods for manufacturing a multilayer film and a magnetic head according to the present invention include a process of alternately depositing the magnetic film and the non-magnetic film as a plating film in a plating bath with a pulse current. The pulse current is divided into a plurality of sections and, in each of the sections, serves as a pulse current having a frequency f with one cycle composed of a period T1 during which a current I1 flows and a period T2 during which a current I2 flows in a direction opposite to the current I1. The current I1, the current I2, the period T1, the period T2 and the frequency f are set to deposit either the magnetic film or the non-magnetic film in each of the sections.

Using a process of depositing a plating film with a pulse current, as described above, the deposition time can be remarkably shortened as compared with a deposition process by sputtering. With the pulse current, moreover, it becomes possible to prevent abnormal growth of the plating film or anomalies in soft magnetic properties which might otherwise be a problem when using a direct current. Furthermore, since the pulse current has sections in which either the magnetic film or the non-magnetic film can be deposited, the magnetic film and the non-magnetic film can be deposited certainly separately.

Regarding the pulse current, preferably, the current I1, the current I2, the period T1 and the period T2 satisfy a relationship of $5\ (mA/cm^2) \leq I1 \leq 30\ (mA/cm^2)$, $-10\ (mA/cm^2) \leq I2 \leq 0\ (mA/cm^2)$, and $0.2 \leq T1/(T1+T2) \leq 0.8$. Particularly preferably, the current I1, the current I2, the period T1, the period T2 and the frequency f satisfy a relationship of $I2=-I1 \times 0.35$, $T1/(T1+T2)=0.625$, and $f=25$ Hz.

Also preferably, the plating bath includes from 2 to 50 g/L Ni ion having an ionic valence of 2, from 1 to 10 g/L Fe ion having an ionic valence of 2, a stress releaser and a surfactant.

Particularly preferably, the plating bath includes $FeSO_4 \cdot 7H_2O$, $NiSO_4 \cdot 6H_2O$, $NH_4Cl$, $H_3BO_3$, $(C_7H_5NO_3S)Na$ and $NaPH_2O_2 \cdot H_2O$.

Under such conditions, the magnetic film and the non-magnetic film can be deposited without changing the plating bath, but only by adjusting the pulse current. This eliminates the steps of changing the plating bath, achieving rationalization of the production process, for example, reduction in production time and cost.

DESCRIPTION OF THE PREFERRED EMBODIMENTS

1. Multilayer Film

Figure 1:
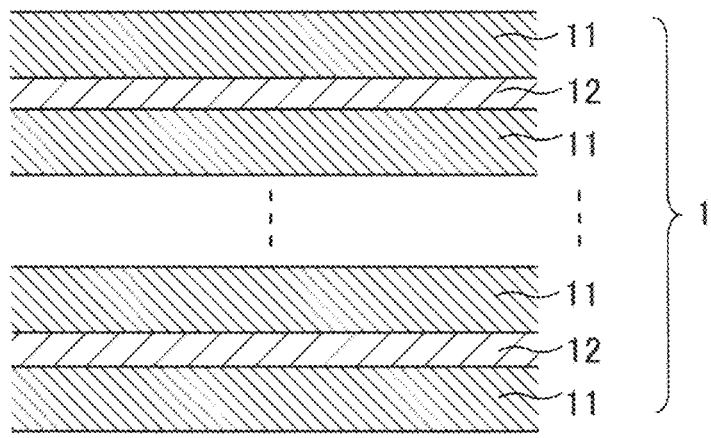
FIG. 1 is a sectional view showing one embodiment of a multilayer film according to the present invention.

Referring to FIG. 1, illustrated is a section of a multilayer film 1 including magnetic films 11 and non-magnetic films 12.

The multilayer film 1 has a structure in which the magnetic films 11 and the non-magnetic films 12 are alternately stacked. Particularly when having a structure in which a non-magnetic film 12 is interposed between magnetic films 11, as shown in FIG. 1, the magnetostatic coupling occurs between the magnetic films 11, stabilizing the magnetic domain structure of each magnetic film 11. With a stable magnetic domain structure, the multilayer film 1 has a high magnetic shielding effect, as is well known, and therefore can be employed as a magnetic shield for electronic devices.

In common practice, the magnetic film 11 is formed from a magnetic material such as Fe, Ni or P, while the non-magnetic film 12 is formed from a non-magnetic material such as Ta, Ti, Au, Pt, $Al_2O_3$ or $SiO_2$. Accordingly, there is a restriction that both the magnetic material and the non-magnetic material have to be prepared for formation of the multilayer film 1 including the magnetic films 11 and the non-magnetic films 12.

The multilayer film according to the present invention is characterized in that the magnetic film 11 and the non-magnetic film 12 are formed as a compound of magnetic materials, Fe, Ni and P (hereinafter referred to as "Fe, Ni, P compound"). Although Fe, Ni and P are magnetic materials, a non-magnetic film having a low magnetic flux density can be obtained by adjusting a composition ratio of Fe, Ni and P in the Fe, Ni, P compound. In the multilayer film according to the present invention, therefore, it becomes unnecessary to use different materials for deposition of the magnetic and non-magnetic films, so that there is an advantage that the production process can be simplified.

Figure 2:
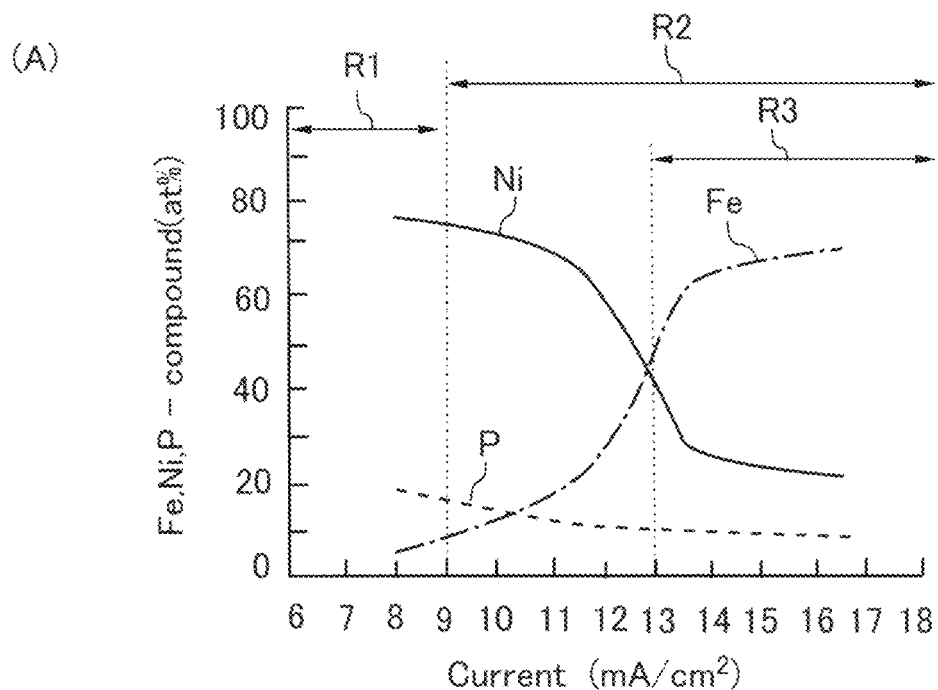
FIG. 2 is a graph showing a composition ratio and a magnetic flux density of a plating film.
Figure 2:
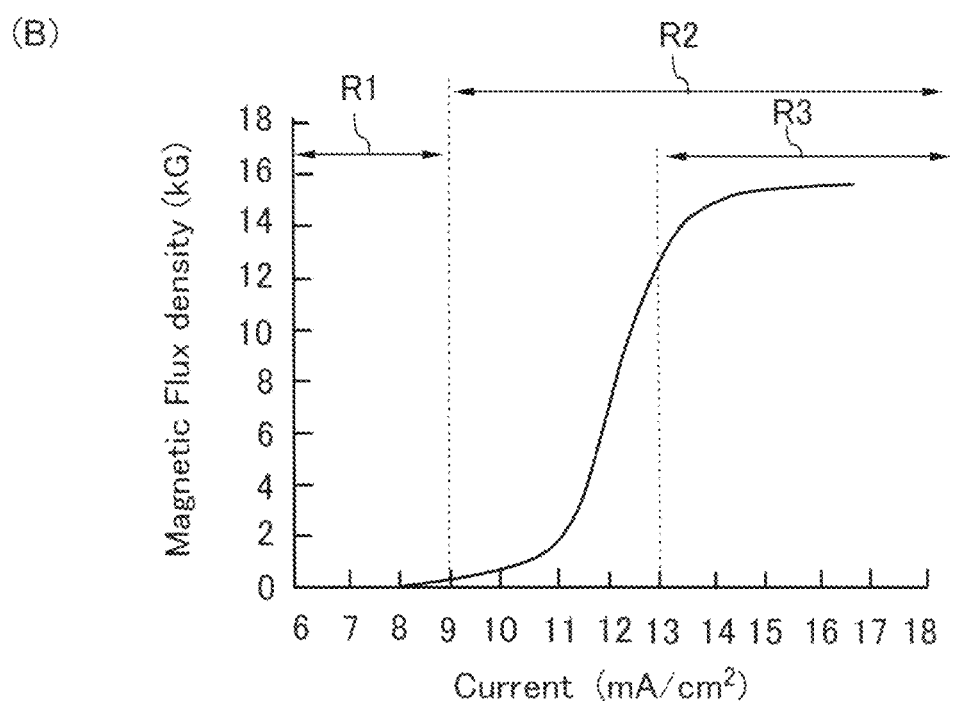

The composition ratio and the magnetic flux density of the Fe, Ni, P compound can be controlled by controlling a current in pulse plating. A concrete explanation will be made with reference to FIG. 2. In FIG. 2(A), the ordinate shows a composition ratio of Fe, Ni and P in the Fe, Ni, P compound, while the abscissa shows a pulse current. Formation of the Fe, Ni, P compound having a composition shown in the ordinate depends on a current value in the abscissa. In FIG. 2(B), the ordinate shows a magnetic flux density of the Fe, Ni, P compound, while the abscissa shows a pulse current. The pulse current in the abscissa of FIG. 2(B) corresponds to that in the abscissa of FIG. 2(A). It should be noted that a process of forming the Fe, Ni, P compound by pulse plating will be described later in detail.

Referring to FIG. 2(A), Ni is indicated by a solid line, Fe is indicated by an alternate long and short dash line, and P is indicated by a dashed line. In a region R1 where the current is equal to or less than 9 ($mA/cm^2$), Ni is a main component. In a region R2 where the current is equal to or greater than 9 ($mA/cm^2$), Ni or Fe is a main component. Particularly in a region R3 where the current is equal to or greater than 13 ($mA/cm^2$), Fe is a main component.

Referring to FIG. 2(B), which is divided into the regions R1 to R3 in the same manner as FIG. 2(A), it is seen that in the region R1, the composition of the Fe, Ni, P compound has a low magnetic flux density and therefore has excellent properties as a non-magnetic body. It is also seen that in the region R2, it has a high magnetic flux density and therefore has excellent properties as a magnetic body. Particularly in the region R3, it has a high magnetic flux density.

By controlling the composition ratio of Fe, Ni and P to have Fe or Ni as a main component, therefore, the Fe, Ni, P compound can be used either as a magnetic film or, particularly in the case where Ni is a main component, as a non-magnetic film and therefore can be employed as a material for forming the multilayer film in which the magnetic films and the non-magnetic films are alternately stacked.

Moreover, although the composition ratios of the magnetic film and the non-magnetic film are not necessarily clarified in FIGS. 2(A) and 2(B), for example, the magnetic film can be obtained by containing from 60 to 90 at. % Fe, from 5 to 30 at. % Ni and from 5 to 20 at. % P, while the non-magnetic film can be obtained by containing from 5 to 20 at. % Fe, from 65 to 85 at. % Ni and from 10 to 30 at. % P.

The Fe, Ni, P compound according to the present invention may further contain Co.

It should be noted that the multilayer film 1 shown in FIG. 1 can be used as a magnetic shield for electronic devices such as a magnetic head by subjecting it to a necessary process such as etching or milling.

2. Method for Manufacturing Multilayer Film

A method for manufacturing a multilayer film in which magnetic films and non-magnetic films are alternately stacked using the Fe, Ni, P compound will be described below with reference to FIGS. 3 to 6.

The multilayer film manufacturing method according to the present invention is characterized in that the Fe, Ni, P compound is deposited as a plating film through a pulse plating process and controlled in such a manner that the deposited plating film becomes either a magnetic film or a non-magnetic film.

Figure 3:
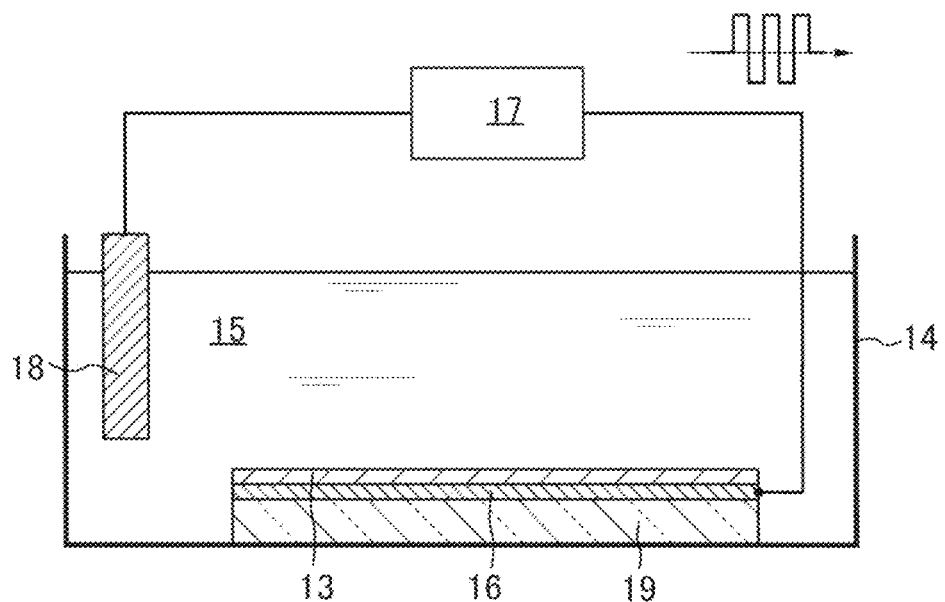
FIG. 3 is a drawing showing one embodiment of a pulse plating process according to the present invention.

Referring to FIG. 3, a plating bath 15 is put in a plating tank 14. The plating bath 15 is adjusted for forming the Fe, Ni, P compound. Specifically, it is preferably adjusted such that divalent Ni ion has a concentration of from 2 to 50 g/L, divalent Fe ion has a concentration of from 1 to 10 g/L and it also includes a stress releaser and a surfactant.

An electrode plate 18 is connected to a power supply 17. The power supply 17 is designed to generate a pulse current. Then, a substrate 19 on which an electrode film 16 is deposited is immersed in the plating bath 15. For example, the substrate 19 comprises a ceramic material such as AlTiC ($Al_2O_3.TiC$). Then, the electrode film 16 is connected to the power supply 17, so that pulse plating is performed on the electrode film 16 to deposit a plating film 13. The pulse plating is performed by passing a pulse current through the electrode film 16.

Figure 4:
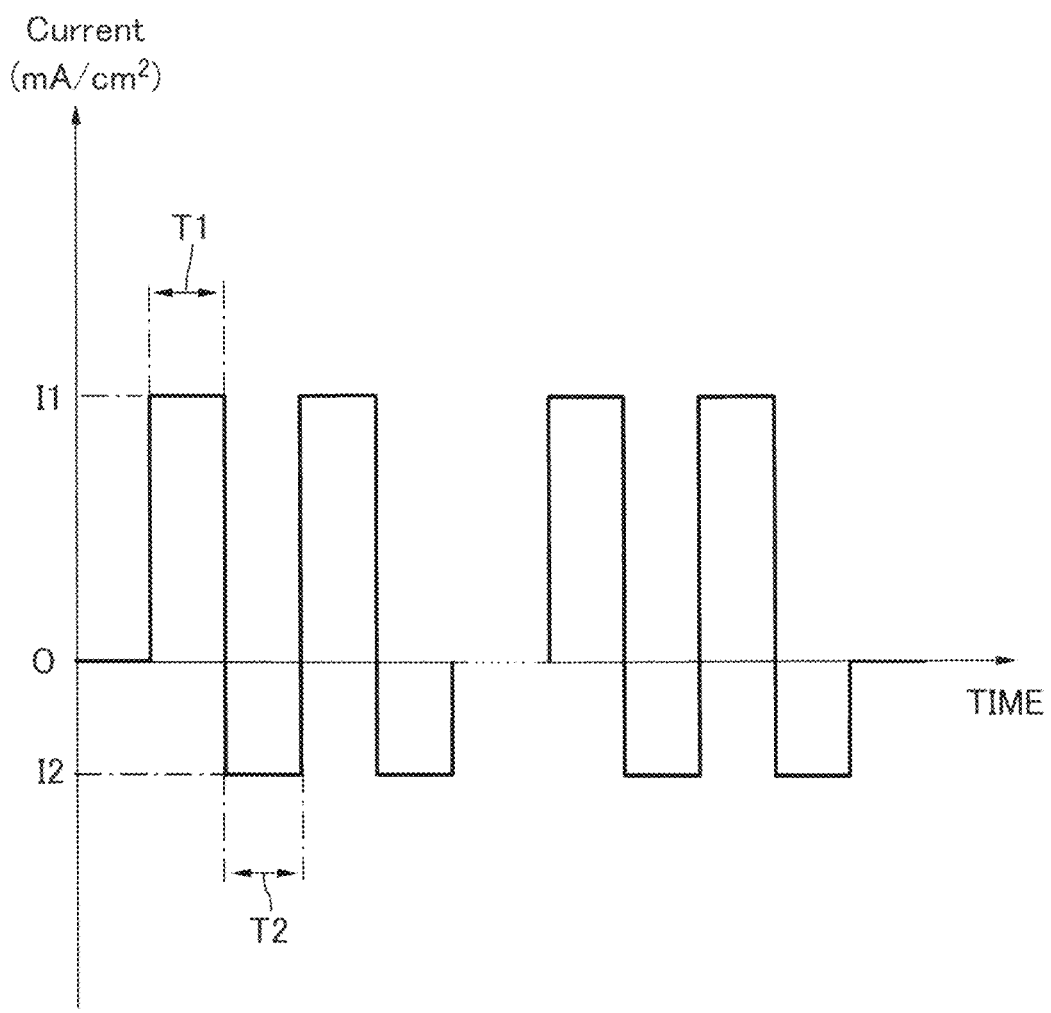
FIG. 4 is a drawing showing one example of a waveform of a pulse current.

FIG. 4 shows one example of a waveform of the pulse current. In FIG. 4, the time is plotted in the abscissa, while the current is plotted in the ordinate. Referring to FIG. 4, a current I1 and a current I2 flow alternately to constitute the pulse current. The current I2 flows in a direction opposite to the current I1. The pulse current is in the form of a pulse with one cycle composed of a period T1 during which the current I1 flows and a period T2 during which the current I2 flows. Moreover, the pulse current has a frequency f. By passing such a pulse current through the electrode film 16 shown in FIG. 3, the Fe, Ni, P compound can be deposited as a single-layer plating film 13 on the electrode film 16. This plating film 13 becomes either a magnetic film or a non-magnetic film depending on the values of the currents I1, I2 of the pulse current shown in FIG. 4. That is, over a wide range from the non-magnetic region to the magnetic region, the plating film 13 can be obtained without changing the plating bath 15, but by controlling the value of the pulse current I1.

The pulse current is preferably set to satisfy a relationship of $$5\ (mA/cm^2) \leq I1 \leq 30\ (mA/cm^2),$$

$$-10\ (mA/cm^2) \leq I2 \leq 0\ (mA/cm^2),\ \text{and}$$

$$0.2 \leq T1/(T1+T2) \leq 0.8.$$

When set at such values, the plating film 13 can be controlled to be either a magnetic film or a non-magnetic film.

The thickness of the plating film 13 increases in proportion to the pulse current flowing time. The deposition rate by the pulse current is from 100 to 1000 angstrom/min, which is from 10 to 100 times faster than the deposition rate by sputtering. When the plating film is deposited by using the pulse current, moreover, it becomes possible to prevent abnormal growth of the plating and anomalies in soft magnetic properties on the high or constant current side which might otherwise be a problem when the multilayer film is formed by using a direct current. It also becomes possible to maintain smoothness of the plating film.

Figure 5:
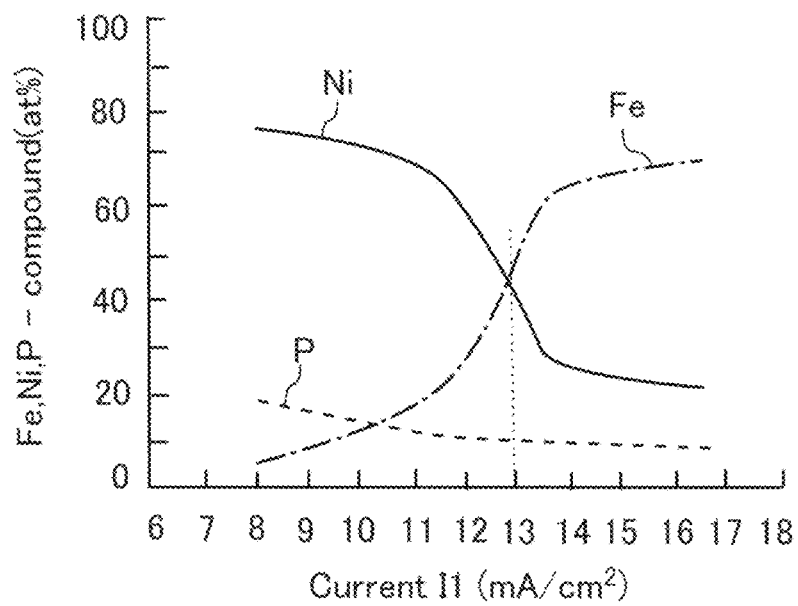
FIG. 5 is a graph showing a relationship between a pulse current and a composition ratio and a magnetic flux density of a plating film deposited by a pulse plating process according to the present invention.
Figure 5:
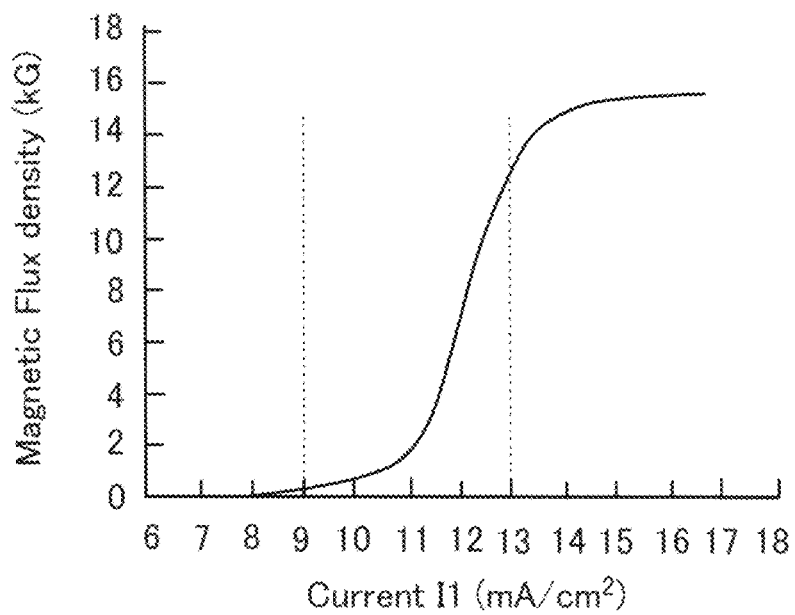

The above-described specific embodiment will be described with reference to FIGS. 3 to 5. At first, the plating bath 15 shown in FIG. 3 is adjusted to include $FeSO_4.7H_2O$: 20 g/L, $NiSO_4.6H_2O$: 50 g/L, $NH_4Cl$: 5 g/L, $H_3BO_3$: 25 g/L, $(C_7H_5NO_3S)Na$: 1 g/L and $NaPH_2O_2.H_2O$: 1 g/L.

Then, the pulse current shown in FIG. 4 is set to satisfy a relationship of $$I2 = -I1 \times 0.35,$$

$$T1/(T1+T2) = 0.625,\ \text{and}$$

$$f = 25\ Hz.$$

By passing such a pulse current through the electrode film 16, the plating film 13 can be deposited as the Fe, Ni, P compound. FIG. 5 shows a relationship between the plating film 13 deposited on the electrode film 16 and the current I1.

In FIG. 5(A), the ordinate shows a composition ratio of Fe, Ni and P in the plating film 13, while the abscissa shows a pulse current I1. In FIG. 5(B), the ordinate shows a magnetic flux density of the plating film 13, while the abscissa shows a pulse current I1.

Referring to FIG. 5(A), Ni is indicated by a solid line, Fe is indicated by an alternate long and short dash line, and P is indicated by a dashed line. In the plating film 13, when the current I1 is equal to or less than 13 ($mA/cm^2$), Ni is a main component, while when the current I1 is equal to or greater than 13 ($mA/cm^2$), Fe is a main component. Referring to FIG. 5(B), the plating film 13 has a low magnetic flux density when the current I1 is equal to or less than 9 ($mA/cm^2$) but has a high magnetic flux density when the current I1 is equal to or greater than 9 ($mA/cm^2$), particularly, equal to or greater than 13 ($mA/cm^2$).

That is, it is seen that the plating film 13 can be deposited as a non-magnetic film by passing the pulse current with the current I1 set equal to or less than 9 ($mA/cm^2$), while the plating film 13 can be deposited as a magnetic film by passing the pulse current with the current I1 set equal to or greater than 9 ($mA/cm^2$), particularly, equal to or greater than 13 ($mA/cm^2$).

Next will be described a case where the waveform of the pulse current flowing in FIG. 3 varies periodically as shown in FIG. 6(A).

Figure 6:
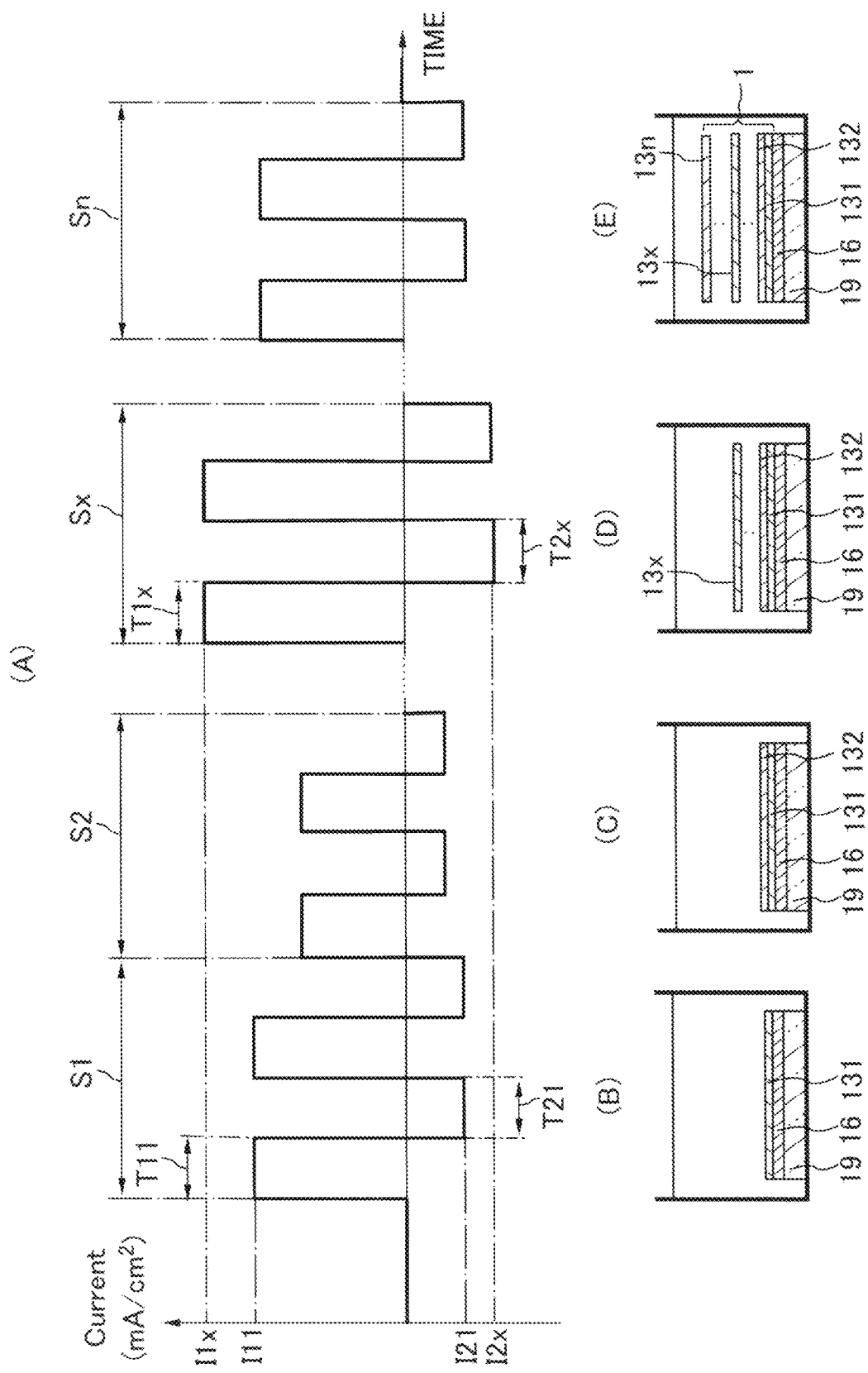
FIG. 6 is a drawing showing one embodiment of a multilayer film manufacturing method using a pulse plating process according to the present invention.

In FIG. 6(A), the time is plotted in the abscissa, while the current is plotted in the ordinate. Referring to FIG. 6, at first, the pulse current is divided into a plurality of sections S1 to Sn. As used herein, n is an integer. In the section Sx of FIG. 6, a current I1x and a current I2x opposite to the current I1x flow alternately in the form of a pulse, wherein one cycle is composed of a period T1x during which the current I1x flows and a period T2x during which the current I2x flows. In the section Sx, moreover, the frequency is fx. x is a variable and an integer satisfying $1 \leq x \leq n$.

When x=1, for example, in the section S1, a current I11 and a current I21 opposite to the current I11 flow alternately in the form of a pulse, wherein one cycle is composed of a period T11 during which the current I11 flows and a period T21 during which the current I21 flows. In the section S1, moreover, the frequency is f1.

The same explanation as for the pulse current shown in FIG. 4 is true for the section Sx, wherein a single-layer plating film is formed. This plating film is the Fe, Ni, P compound and becomes either a magnetic film or a non-magnetic film depending on the values of the currents I1x, I2x.

For example, the pulse current shown in FIG. 6(A) is preferably set to satisfy a relationship of $$5\ (mA/cm^2) \leq I1x \leq 30\ (mA/cm^2),$$

$$-10\ (mA/cm^2) \leq I2x \leq 0\ (mA/cm^2),\ \text{and}$$

$$0.2 \leq T1/(T1+T2) \leq 0.8.$$

When the pulse current having a waveform shown in FIG. 6(A) is passed through the electrode film 16 shown in FIG. 3, a multilayer film can be formed through a deposition process shown in FIGS. 6(B) to 6(E). In FIGS. 6(B) to 6(E), FIG. 3 is depicted in a simplified form, wherein the pulse current is allowed to pass through the electrode film 16 in the same manner as in FIG. 3.

In FIG. 6(B), specifically, while the pulse current of the section S1 is flowing through the electrode film 16 formed on the substrate 19, a plating film 131 is deposited on the electrode film 16. Then, while the pulse current of the section S2 is flowing, a plating film 132 is deposited on the plating film 131 as shown in FIG. 6(C). Thereafter, while the pulse current of the section Sx is flowing, a plating film 13x is deposited as shown in FIG. 6(D). Then, finally, while the pulse current of the section Sn is flowing, a plating film 13n is deposited as shown in FIG. 6(E), thus providing the multilayer film 1. The plating film 13x can be deposited either as a magnetic film or as a non-magnetic film by adjusting the values of the currents I1x, I2x in the section Sx.

Formation of the multilayer film 1 will be described with reference to a concrete example. At first, the plating bath 15 shown in FIG. 3 is adjusted to include $FeSO_4 \cdot 7H_2O$: 20 g/L, $NiSO_4 \cdot 6H_2O$: 50 g/L, $NH_4Cl$: 5 g/L, $H_3BO_3$: 25 g/L, $(C_7H_5NO_3S)Na$: 1 g/L and $NaPH_2O_2 \cdot H_2O$: 1 g/L.

Then, the pulse current shown in FIG. 6(A) is set to satisfy a relationship of $$I2x = -I1x \times 0.35,$$

$$T1x/(T1x+T2x) = 0.625,$$

$$fx = 25 \text{ Hz, and}$$

n is an odd number satisfying n≥3.

Furthermore, the current I1x is set equal to or greater than 13 ($mA/cm^2$) in sections Sx in which x is an odd number, while the current I1x is set equal to or less than 9 ($mA/cm^2$) in sections Sx in which x is an even number. Since the same explanation as for the pulse current shown in FIG. 4 is true for the section Sx, the plating film 13x can be deposited as a magnetic film in the sections Sx in which x is an odd number, while the plating film 13x can be deposited as a non-magnetic film in the sections Sx in which x is an even number.

When the pulse current thus adjusted is passed through the electrode film 16 shown in FIGS. 6(B) to 6(E), at first, while the pulse current of the section S1 is flowing through the electrode film 16, the plating film 131 is deposited as a magnetic film on the electrode film 16, as shown in FIG. 6(B). Then, while the pulse current of the section S2 is flowing through the electrode film 16, the plating film 132 is deposited as a non-magnetic film on the plating film 131, as shown in FIG. 6(C). Thereafter, as shown in FIG. 6(D), while the pulse current of the section Sx in which x is an odd number is flowing, the plating film 13x is deposited as a magnetic film, and while the pulse current of the section Sx in which x is an even number is flowing, the plating film 13x is deposited as a non-magnetic film. Then, finally, while the pulse current of the section Sn is flowing through the electrode film 16, the plating film 13n is deposited as a magnetic film, thus providing the multilayer film 1 in which the magnetic films and the non-magnetic films are alternately stacked.

Figure 7:
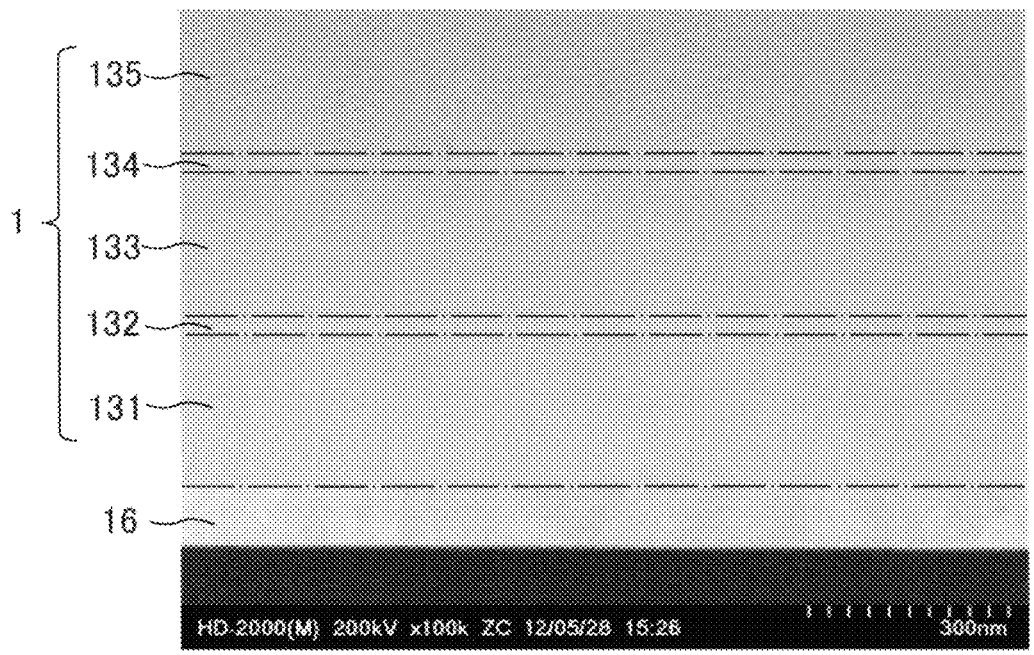
FIG. 7 is a drawing showing one embodiment of a multilayer film actually formed using a pulse plating process according to the present invention.

FIG. 7 shows a multilayer film 1 that was actually formed according to the concrete example, wherein the pulse current was set as in (1) to (3). FIG. 7 is an image obtained by observing the multilayer film 1 with a transmission electron microscope, wherein alternate long and short dash lines are added as an auxiliary line so that the interlayer structure can easily be understood. Referring to FIG. 7, the multilayer film 1 is formed by depositing plating films 131 to 135 on the electrode film 16. The electrode film comprises an alloy of Ti and Cu and has a thickness of 100 nm. The plating films 131, 133, 135 are deposited as a magnetic film, each having a thickness of 200 nm. On the other hand, the plating films 132, 134 are deposited as a non-magnetic film, each having a thickness of 10 nm.

(1) The number of sections n=5
(2) In the sections S1, S3, S5 of the pulse current, the values of the currents I11, I13, I15 are set at 16.5 ($mA/cm^2$) and the periods T11, T13, T15 are set at 25 milliseconds. At this time, the values of the currents I21, I23, I25 are set at about −5.8 ($mA/cm^2$) and the periods T21, T23, T25 are set at 15 milliseconds.
(3) In the sections S2, S4 of the pulse current, the currents I12, I14 are set at 8.3 ($mA/cm^2$) and the periods T12, T14 are set at 25 milliseconds. At this time, the values of the currents I22, I24 are set at about −2.9 ($mA/cm^2$) and the periods T22, T24 are set at 15 milliseconds.

By using the pulse current composed of a plurality of sections for formation of a multilayer film, as described above, the multilayer film in which the magnetic films and the non-magnetic films are stacked can be obtained without changing the plating bath 15, but by controlling the pulse current. This eliminates the steps of changing the plating bath 15, reducing the production time and improving the cost performance.

Moreover, the foregoing method for manufacturing a multilayer film in which magnetic films and non-magnetic films are alternately stacked is also applicable to formation of a magnetic shield for electronic devices. For example, the electronic device may be a magnetic head.

Basically, the magnetic head can be manufactured by sequentially forming and stacking components on a wafer for the magnetic head using a conventional thin-film process including a film formation technique such as plating or sputtering, a patterning technique such as photolithography, an etching technique such as dry etching or wet etching, and a polishing technique such as chemical mechanical polishing (CMP).

Referring to FIG. 6, the substrate 19 and the electrode film 16 shown in FIGS. 6(B) to 6(E) can be considered as the wafer for the magnetic head. Then, when the pulse current shown in FIG. 6(A) is passed through the electrode film 16, the magnetic film 1 can be formed as a magnetic shield layer through the process of FIGS. 6(B) to 6(E), as described above. It should be noted that the wafer includes all the structures underlying the magnetic shield layer to be formed.

Particularly preferably, the magnetic shield layer has a structure in which a non-magnetic film is interposed between magnetic films. This is because the magnetostatic coupling occurs in the magnetic films, stabilizing the magnetic domain structure of each magnetic film, which results in improving the magnetic shielding effect.

For formation of the magnetic shield layer having such a structure, for example, the pulse current can be set as in (4) to (6).

(4) The number of sections n is an odd number and satisfies n≥3.
(5) In sections Sx in which x is an odd number, the current I1x is set equal to or greater than 13 ($mA/cm^2$).
(6) In sections Sx in which x is an even number, the current I1x is set equal to or less than 9 ($mA/cm^2$).

3. Magnetic Head

Figure 8:
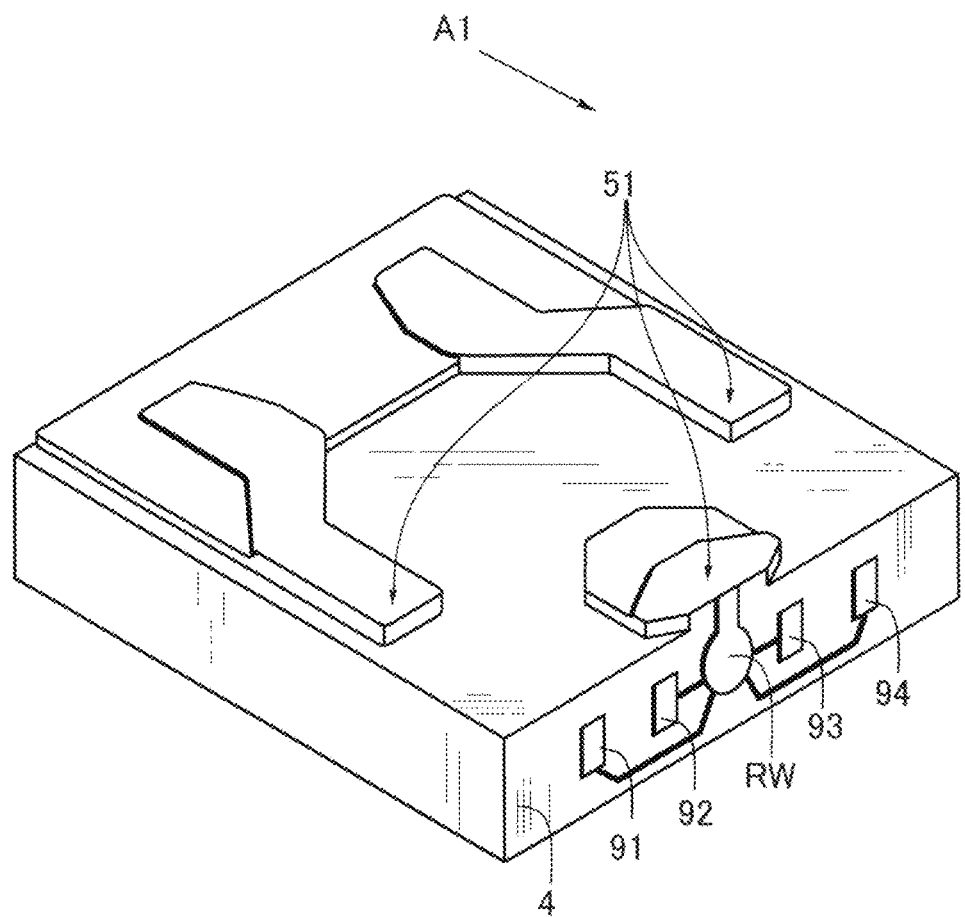
FIG. 8 is a perspective view showing the appearance of a magnetic head according to the present invention.
Figure 9:
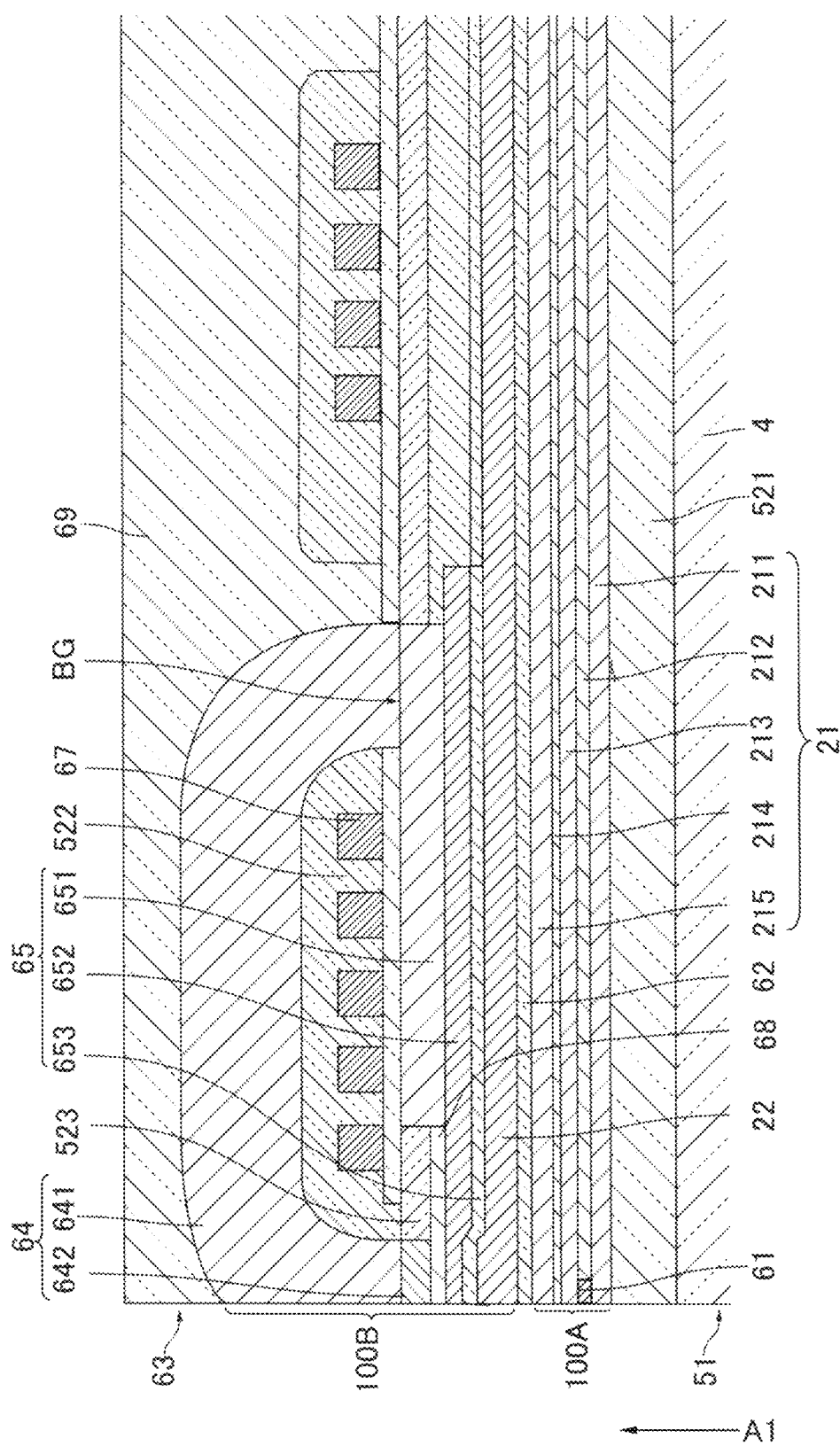
FIG. 9 is a partially enlarged sectional view of FIG. 8.

FIGS. 8 to 9 show the external appearance of a magnetic head to be used in combination with a rapidly spinning magnetic recording medium such as a hard disk and its details. Magnetic heads of this type are generally called "floating-type".

A common structure of magnetic heads will be described with reference to FIGS. 8 to 9. In the magnetic head, a thin-film element RW for performing both recording and reproducing processes is attached to one face of a slider substrate 4 having a generally rectangular prism structure. The slider substrate 4 has an air bearing surface (ABS) 51 directly relating to floating characteristics, and the thin-film element RW is attached to a trailing-side end face that is perpendicular to the ABS 51 as seen in an airflow direction A1.

On the trailing-side end face, moreover, bumps 91 to 94 are provided for the thin-film element RW. In magnetic heads of this type, the thin-film element RW includes a recording element and a reproducing element, and usually, four bumps 91 to 94 are provided corresponding to these elements. Details of the thin-film element RW are shown in FIG. 9.

The magnetic head is a complex-type head which can perform recording/reproducing of magnetic information in association with a magnetic recording medium (hard disk). In the magnetic head, an insulating layer 521, a reproducing head portion 100A for performing a reproducing process using magneto-resistive effect (MR effect), a separating layer 62, a recording head portion 100B for performing a recording process in a perpendicular recording method, and an overcoat layer 69 are stacked in the named order on the slider substrate 4 comprising, for example, a non-magnetic insulating material such as AlTiC.

The insulating layer 521, the separating layer 62 and the overcoat layer 69 comprise, for example, a non-magnetic insulating material such as aluminium oxide ($Al_2O_3$).

The reproducing head portion 100A is formed, for example, by stacking a lower read shield layer 211, a shield gap film 212, and upper read shield layers 213 to 215 in the named order. In the shield gap film 212, a reproducing element 61 is embedded in such a manner as to be exposed on a medium facing surface 63.

The lower read shield layer 211, the shield gap film 212 and the upper read shield layers 213 to 215 are each intended to magnetically separate the reproducing element 61 from the surroundings and constitute a magnetic shield layer 21. The magnetic shield layer 21 extends from the medium facing surface 63 toward the side opposite from the medium facing surface 63. The upper read shield layers 213, 215 are magnetic films which hold therebetween the upper read shield layer 214 which is a non-magnetic film. The lower read shield layer 211 is a magnetic film, and the shield gap film 212 is a non-magnetic film 12. It should be noted that all of the lower read shield layer 211, the shield gap film 212 and the upper read shield layers 213 to 215 are the Fe, Ni, P compound according to the present invention. For example, the magnetic shield layer 21 can be manufactured by using the pulse plating process according to the present invention.

The reproducing element 61 uses giant magneto-resistive effect (GMR) or tunneling magneto-resistive effect (TMR), for example.

The recording head portion 100B is, for example, a perpendicular magnetic recording head formed by stacking a magnetic shield layer 22, a magnetic pole film 65, a gap film 68, a thin-film coil 67 embedded in an insulating film 522, and a magnetic film 64.

For example, the magnetic shield layer 22 has a structure in which a non-magnetic film is interposed between magnetic films. All of the magnetic films and the non-magnetic film constituting the magnetic shield layer 22 are the Fe, Ni, P compound according to the present invention and can be manufactured by using the pulse plating process according to the present invention.

The magnetic pole film 65 leads a magnetic flux to the recording medium and, for example, extends from the medium facing surface 63 toward the side opposite from the medium facing surface 63. The magnetic pole film 65 is formed, for example, by stacking a non-magnetic film 653, a recording magnetic pole film 652 and an auxiliary magnetic pole film 651 in the named order.

The auxiliary magnetic pole film 651, for example, extends from the side of the medium facing surface 63 to the back gap BG. The auxiliary magnetic pole film 651 is, for example, disposed on the trailing side with respect to the recording magnetic pole film 652. The non-magnetic film 653 electrically and magnetically separates the recording magnetic pole film 652 from the surroundings. The non-magnetic film 653, for example, extends from the medium facing surface 63 and comprises a non-magnetic insulating material such as alumina or aluminium nitride. However, the range over which the non-magnetic film 653 extends may be set arbitrarily. The section of the non-magnetic film 653 parallel to the medium facing surface 63 is U-shaped, and the recording magnetic pole film 652 is partially embedded therein. Particularly, the non-magnetic film 653 includes a non-magnetic film formed by an ALD process, for example, and has a uniform thickness along the periphery of the recording magnetic pole film 652.

The recording magnetic pole film 652 is a main magnetic flux-emitting portion.

Although not illustrated, the present invention may be a thermally assisted magnetic head. The thermally assisted magnetic head has the function of enabling data writing while locally reducing the coercivity of a recording medium by using heat of a laser beam or the like. The thermally assisted magnetic head includes a near-field light generating element having an optical waveguide, a surface plasmon generating element and so on, and the end face of the recording magnetic pole film 652 at the medium facing surface 63 is preferably located close to the near-field light generating element.

Although not illustrated, furthermore, the recording magnetic pole film 652 includes a seed layer and a plating layer formed on the seed layer. The seed layer is used to let the plating layer grow in a magnetic head manufacturing process and comprises, for example, a magnetic material similar to that of the plating layer. The plating layer comprises, for example, a magnetic material having a high saturation magnetic flux density such as a nickel-iron alloy (FeNi) or an iron-based alloy. Examples of the iron-based alloy include an iron-cobalt alloy (FeCo) and an iron-cobalt-nickel alloy (FeCoNi).

The thin-film coil 67 generates a magnetic flux and comprises, for example, a highly conductive material such as copper (Cu). The thin-film coil 67 is wound around the back gap BG to have a winding structure (or spiral structure).

The insulating film 522 electrically separates the thin-film coil 67 from the surroundings and comprises, for example, a non-magnetic insulating material such as a photoresist or a spin on glass (SOG) which becomes liquid when heated.

The magnetic film 64 absorbs a spreading component of a magnetic flux emitted from the recording magnetic pole film 652 toward the recording medium so as to increase the gradient of the perpendicular magnetic field and also absorbs a magnetic flux after recording so as to circulate the magnetic flux between the recording head portion 100B and the recording medium. The magnetic film 64 extends from the medium facing surface 63 toward the side opposite from the medium facing surface 63 on the trailing side of the recording magnetic pole film 652 and is connected to the magnetic pole film 65 through the back gap BG. The end face of the magnetic film 64 on the side close to the medium facing surface 63 is, for example, of a rectangular shape. The magnetic film 65 includes, for example, a write shield layer 642 and a return yoke layer 641 which are distinct from each other.

The write shield layer 642 mainly has a function of increasing the gradient of the perpendicular magnetic field and comprises, for example, a magnetic material having a high saturation magnetic flux density such as a permalloy or an iron-based alloy. Particularly by absorbing a spreading component of a magnetic flux emitted from the recording magnetic pole film 652, the write shield layer 642 (1) increases the magnetic field gradient of the perpendicular magnetic field, (2) decreases the recording width, and (3) incorporates an oblique magnetic field component into the perpendicular magnetic field. However, the write shield layer 642 may also have a function of circulating the magnetic flux like the return yoke layer 641. The write shield layer 642 extends from the medium facing surface 63 toward the side opposite from the medium facing surface 63 to have its rear end adjacent to the insulating film 523.

The return yoke layer 641 has a function of circulating the magnetic flux and comprises, for example, a magnetic material similar to that of the write shield layer 642. The return yoke layer 641 extends from the medium facing surface 63, through above the insulating film 522, to the back gap BG on the trailing side of the write shield layer 642 and is connected to the magnetic pole film 65 through the back gap BG. The return yoke layer 641 is also connected to the write shield layer 642.

The overcoat layer 69 protects the magnetic head and comprises, for example, a non-magnetic insulating material such as alumina.

4. Magnetic Head Device

Moreover, the present invention discloses a magnetic head device. The magnetic head device includes a magnetic head and a head support device. The head support device supports the head in such a manner as to permit rolling and pitching of the head and may be an HGA (head gimbal assembly) or an HAA (head arm assembly).

Figure 10:
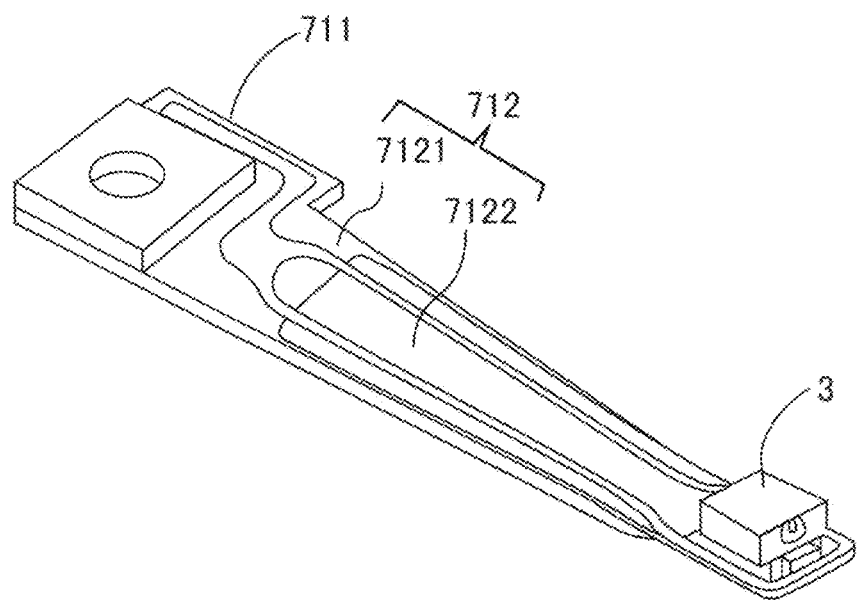
FIG. 10 is a perspective view of a head gimbal assembly according to the present invention.

FIG. 10 is a perspective view of an HGA according to the present invention. Referring to FIG. 10, the HGA includes a magnetic head 3, a head support device 711 and a suspension 712. The suspension 712 includes a load beam 7121 and a flexure 7122. The flexure 7122 is formed from a thin leaf spring and attached at one side to the load beam 7121. The magnetic head 3 is attached to the other side of the flexure 7122. The magnetic head 3 is attached to one side of the flexure 7122 by means of an adhesive or the like. For example, the magnetic head 3 is the one shown in FIG. 9.

Figure 11:
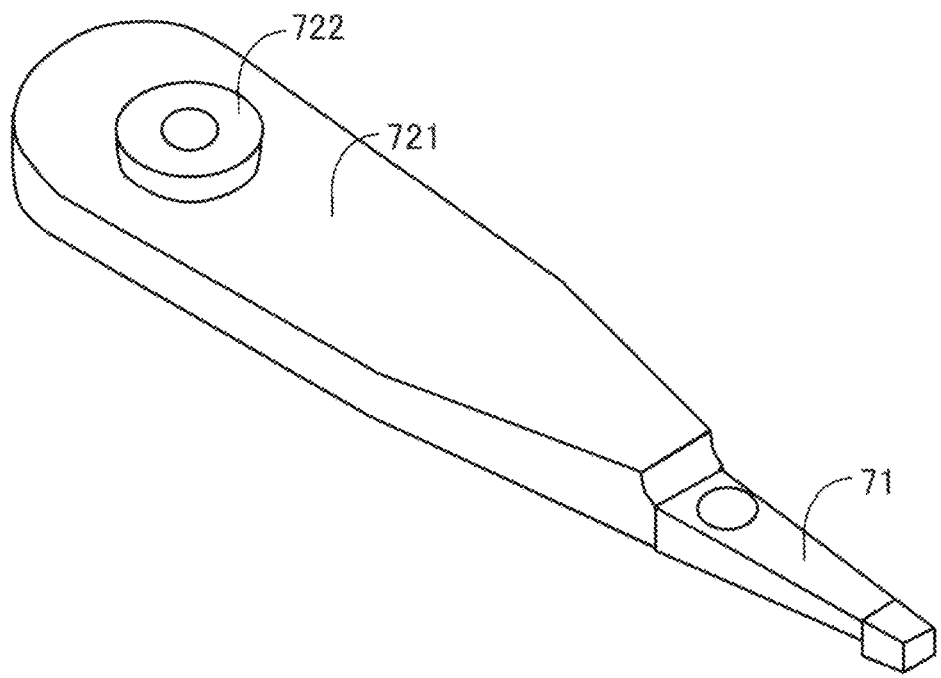
FIG. 11 is a perspective view of a head arm assembly according to the present invention.

FIG. 11 is a perspective view of an HAA according to the present invention. Referring to FIG. 11, the HAA includes an HGA 71 and an arm 721. The arm 721 is integrally formed from a suitable non-magnetic metallic material such as aluminum alloy. The arm 721 is provided with a mounting hole 722. For example, the HGA 71 is the one shown in FIG. 10 with one end secured to the arm 721 with a ball connecting structure or the like.

5. Magnetic Recording/Reproducing Apparatus

Figure 12:
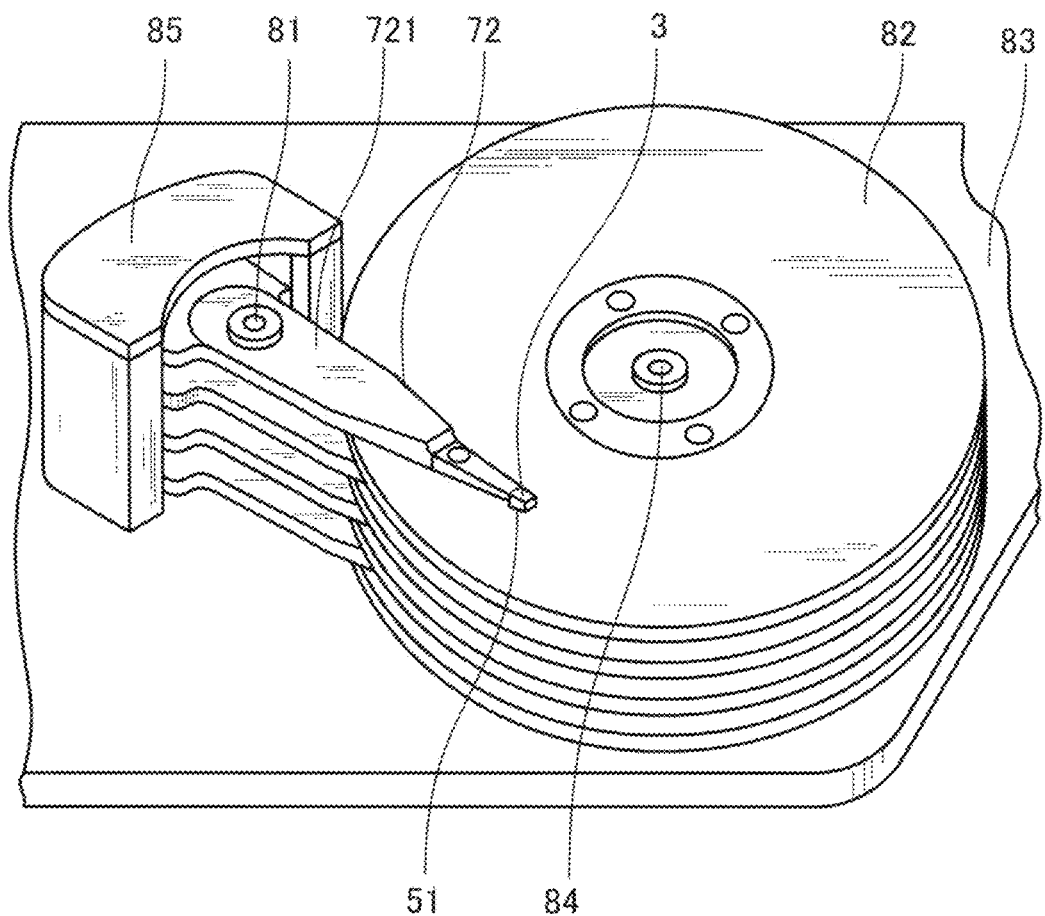
FIG. 12 is a drawing showing a magnetic recording/reproducing apparatus according to the present invention.

Furthermore, the present invention discloses a magnetic recording/reproducing apparatus. FIG. 12 is a perspective view of a magnetic recording/reproducing apparatus according to the present invention, showing a typical structure of magnetic recording/reproducing apparatuses. For example, the magnetic recording/reproducing apparatus is a hard disk drive.

Referring to FIG. 12, the magnetic recording/reproducing apparatus includes HAA 72 and magnetic recording media 82. For example, the magnetic recording/reproducing apparatus contains the magnetic recording media 82 and the HAA 72 inside a case 83.

The magnetic recording media 82 are rotatable about a spindle motor 84 which is fixed to the case 83. For example, the HAA 72 is the one shown in FIG. 11 with the arm 721 connected to an assembly carriage 85 and pivotable about a pivot bearing 81 which is fixed to the case 83. In addition, the HAA 72 has a magnetic head 3. The magnetic head 3 is the one shown in FIG. 9.

The assembly carriage 85 is constructed to include, for example, a driving source such as a voice coil motor. For example, this magnetic recording/reproducing apparatus is of the type having a plurality of the arms 721 integrally pivotable about the pivot bearing 81. In FIG. 12, the case 83 is shown in a partially cut-away state, making it easy to see the internal structure of the magnetic recording/reproducing apparatus.

When the magnetic recording medium 82 rotates for recording or reproducing of information, the magnetic head 3 takes off from a recording surface of the magnetic recording medium 82 utilizing an airflow generated between the recording surface of the magnetic recording medium 82 and the ABS 51, and performs magnetic recording or reproducing.

The present invention has been described in detail above with reference to preferred embodiments. However, obviously those skilled in the art could easily devise various modifications of the invention based on the technical concepts underlying the invention and teachings disclosed herein.

What is claimed is:

1. A multilayer film comprising:
a magnetic film; and
a non-magnetic film,
the magnetic film and the non-magnetic film being alternately stacked, the magnetic film containing Fe, Ni and P but having Fe or Ni as a main component, the non-magnetic film containing Fe, Ni and P but having Ni as a main component.

2. The multilayer film of claim 1, wherein the magnetic film contains from 60 to 90 at. % Fe, from 5 to 30 at. % Ni and from 5 to 20 at. % P, while the non-magnetic film contains from 5 to 20 at. % Fe, from 65 to 85 at. % Ni and from 10 to 30 at. % P.

3. A method for manufacturing a multilayer film, the multilayer film including a magnetic film and a non-magnetic film, the magnetic film and the non-magnetic film being alternately stacked, the magnetic film containing Fe, Ni and P but having Fe or Ni as a main component, the non-magnetic film containing Fe, Ni and P but having Ni as a main component, the method comprising a process of depositing the magnetic film and the non-magnetic film by changing a composition ratio of the Fe, Ni and P.

4. The multilayer film manufacturing method of claim 3, including a process of alternately depositing the magnetic film and the non-magnetic film as a plating film in a plating bath with a pulse current,
wherein the pulse current is divided into a plurality of sections and, in each of the sections, serves as a pulse current having a frequency f with one cycle composed of a period T1 during which a current I1 flows and a period T2 during which a current I2 flows in a direction opposite to the current I1, and
the current I1, the current I2, the period T1, the period T2 and the frequency f are set to deposit either the magnetic film or the non-magnetic film in each of the sections.

5. The multilayer film manufacturing method of claim 4, wherein the current I1, the current I2, the period T1 and the period T2 satisfy a relationship of $$5 \text{ (mA/cm}^2) \leq I1 \leq 30 \text{ (mA/cm}^2),$$

$$-10 \text{ (mA/cm}^2) \leq I2 \leq 0 \text{ (mA/cm}^2), \text{ and}$$

$$0.2 \leq T1/(T1+T2) \leq 0.8.$$

6. The multilayer film manufacturing method of claim 4, wherein the plating bath includes Ni ion, Fe ion, a stress releaser and a surfactant, the Ni ion has an ionic valence of 2 and a concentration of from 2 to 50 g/L, and the Fe ion has an ionic valence of 2 and a concentration of from 1 to 10 g/L.

7. The multilayer film manufacturing method of claim 4, wherein the plating bath includes $FeSO_4.7H_2O$, $NiSO_4.6H_2O$, $NH_4Cl$, $H_3BO_3$, $(C_7H_5NO_3S)Na$ and $NaPH_2O_2.H_2O$, and the current I1, the current I2, the period T1, the period T2 and the frequency f satisfy a relationship of $$I2 = -I1 \times 0.35,$$

$$T1/(T1+T2) = 0.625, \text{ and}$$

$$f = 25 \text{ Hz}.$$

8. A magnetic head comprising:
a magnetic shield, the magnetic shield being a multilayer film, the multilayer film including
a magnetic film, and
a non-magnetic film,
the magnetic film and the non-magnetic film being alternately stacked, the magnetic film containing Fe, Ni and P but having Fe or Ni as a main component, the non-magnetic film containing Fe, Ni and P but having Ni as a main component.

9. A magnetic head device comprising:
a magnetic heat; and
a head support device,
the magnetic head being the magnetic head of claim 8, the head support device supporting the magnetic head.

10. A magnetic recording/reproducing apparatus comprising:
a magnetic head device; and
a magnetic recording medium,
the magnetic head device being the magnetic head device of claim 9 and configured to perform magnetic recording and reproducing of magnetic record with the magnetic recording medium.

11. A method for manufacturing a magnetic head including a magnetic shield, the magnetic shield being a multilayer film, the multilayer film including a magnetic film and a non-magnetic film, the magnetic film and the non-magnetic film being alternately stacked, the magnetic film containing Fe, Ni and P but having Fe or Ni as a main component, the non-magnetic film containing Fe, Ni and P but having Ni as a main component, the method comprising a process of depositing the magnetic film and the non-magnetic film by changing a composition ratio of the Fe, Ni and P.

12. The method for manufacturing a magnetic head including a magnetic shield of claim 11, including a process of alternately depositing the magnetic film and the non-magnetic film as a plating film in a plating bath with a pulse current,
wherein the pulse current is divided into a plurality of sections and in each of the sections, serves as a pulse current having a frequency f with one cycle composed of a period T1 during which a current I1 flows and a period T2 during which a current I2 flows in a direction opposite to the current I1, and
the current I1, the current I2, the period T1, the period T2 and the frequency f are set to deposit either the magnetic film or the non-magnetic film in each of the sections.

13. The method for manufacturing a magnetic head including a magnetic shield of claim 12, wherein the current I1 the current I2, the period T1 and the period T2 satisfy a relationship of $$5 \text{ (mA/cm}^2) \leq I1 \leq 30 \text{ (mA/cm}^2),$$

$$-10 \text{ (mA/cm}^2) \leq I2 \leq 0 \text{ (mA/cm}^2), \text{ and}$$

$$0.2 \leq T1/(T1+T2) \leq 0.8.$$

14. The method for manufacturing a magnetic head including a magnetic shield of claim 12, wherein the plating bath includes Ni ion, Fe ion, a stress releaser and a surfactant, the Ni ion has an ionic valence of 2 and a concentration of from 2 to 50 g/L, and the Fe ion has an ionic valence of 2 and a concentration of from 1 to 10 g/L.

15. The method for manufacturing a magnetic head including a magnetic shield of claim 12, wherein the plating bath includes $FeSO_4.7H_2O$, $NiSO_4.6H_2O$, $NH_4Cl$, $H_3BO_3$, $(C_7H_5NO_3S)Na$ and $NaPH_2O_2.H_2O$, and the current I1, the current I2, the period T1, the period T2 and the frequency f satisfy a relationship of $$I2 = -I1 \times 0.35,$$

$$T1/(T1+T2) = 0.625, \text{ and}$$

$$f = 25 \text{ Hz}.$$

* * * * *